United States Patent [19]

Borden

[11] Patent Number: 5,752,113
[45] Date of Patent: May 12, 1998

[54] PANORAMIC INDEXING CAMERA MOUNT

[76] Inventor: John Borden, 6 Williams St., Cambridge, Mass. 02139

[21] Appl. No.: 577,292

[22] Filed: Dec. 22, 1995

[51] Int. Cl.$^6$ .................................................. G03B 29/00
[52] U.S. Cl. .................................................. 396/428
[58] Field of Search ............... 396/20, 419, 428; 248/542, 349.1, 183.2; 348/36, 37; 33/569, 570

[56] References Cited

U.S. PATENT DOCUMENTS

| | | | |
|---|---|---|---|
| 1,503,437 | 7/1924 | James | 396/20 |
| 2,111,854 | 3/1938 | Gasso et al. | 396/20 |
| 3,183,810 | 5/1965 | Campbell et al. | 396/20 |
| 4,135,305 | 1/1979 | Krause | 33/570 |
| 5,040,759 | 8/1991 | Wainwright | 248/186 |
| 5,259,584 | 11/1993 | Wainwright | 248/542 |

OTHER PUBLICATIONS

Heid, Jim. "New Edge", *Macworld*, pp. 99–104 (Jul. 1995).

*Primary Examiner*—Howard B. Blankenship
*Attorney, Agent, or Firm*—Hamilton, Brook, Smith & Reynolds, P.C.

[57] ABSTRACT

Systems, particularly cameras and mounts, for capturing images of a panorama to allow the combination of the images into a continuous image are disclosed. In particular the invention is directed to mounts that rotate image capturing devices such that the images may be electronically stitched together. One such mount includes a base, which can be held on a tripod, and a frame rotatably connected to the base for supporting an image capturing device. Usually, such image capturing device is a chemical-film or digital camera. In some applications, a video camera will be useful of photographing a panorama at high speed. The mount has a rotational advance system that enables the rotation of the frame through discrete angles through 360°. The frame may have a fordable arm for carrying an image capturing device in both a portrait and landscape orientation. High speed systems are also disclosed that use controllers to coordinate the rotation of the base with a timing of the images captured by the image capturing device to enable stitching of the images into a coherent panorama. As a result, a panorama can be photographed in less than one second.

19 Claims, 6 Drawing Sheets

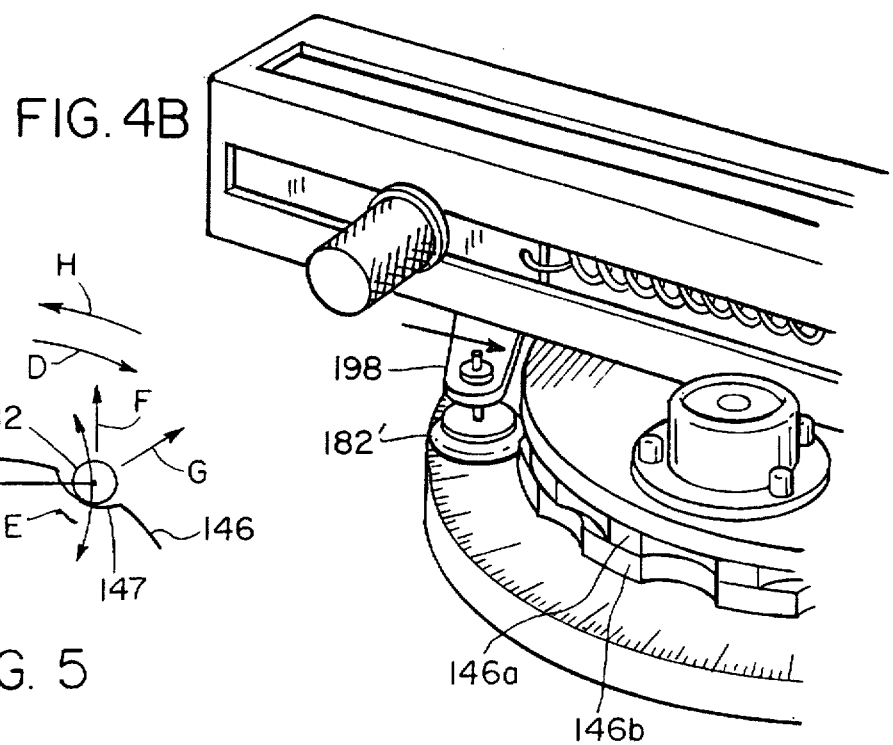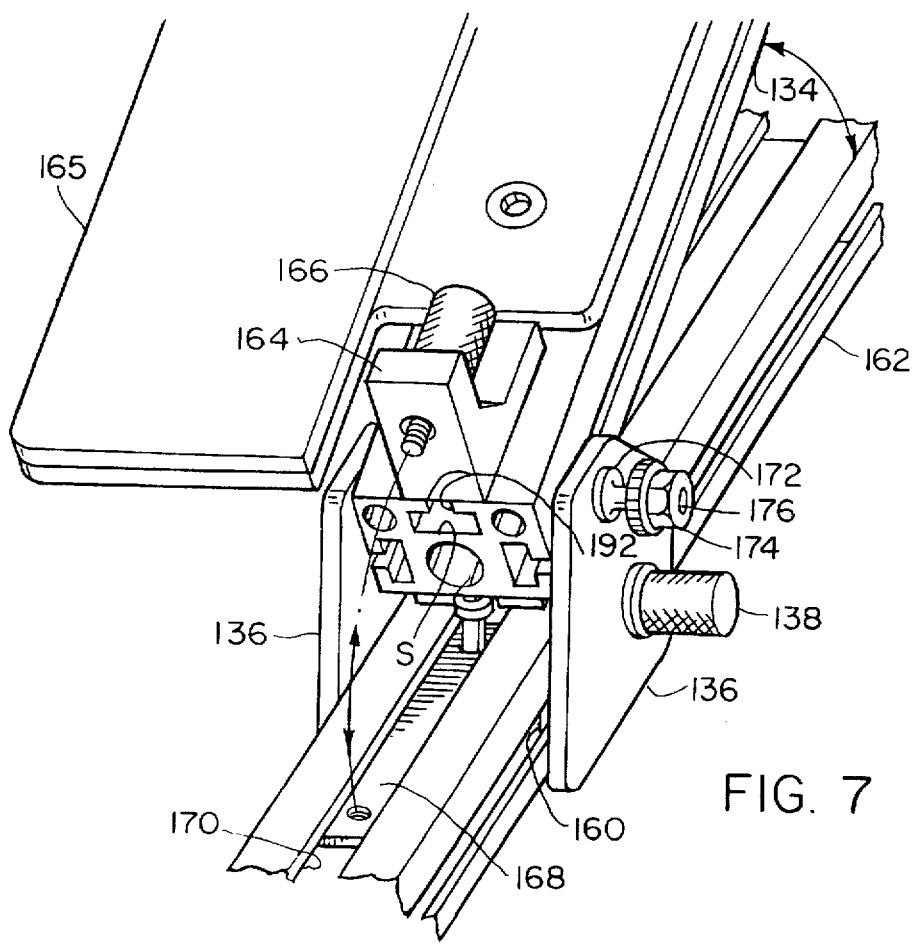

PANORAMIC INDEXING CAMERA MOUNT

BACKGROUND OF THE INVENTION

Virtual reality computer systems seek to mimic the sensory experience associated with moving through three dimensional space using a two dimensional display device. The process requires that displayed images be updated in response to the location or position of a viewer in a defined virtual space. Powerful data processing capabilities are required to determine the appropriate displayed images, and large data storage capabilities are necessary to store the images for each potential view.

Although sometimes entirely fanciful, in many applications the displayed images are in whole or in part taken from real world scenes. This is common in applications in which the objective is education. For example, the viewer could be shown scenes from a Roman piazza in order to provide an understanding of day-to-day life in the city. Marketing or advertising applications also draw from this use, showing potential customers the marketed goods in an intended environment.

Panoramic images provide the continuous scenic backdrop in these applications. Usually these images extend entirely through 360°. The obvious method for initially capturing these panoramic images is with a panoramic camera. These devices usually rotate in a circle to photograph the panorama on a long continuous piece of film. The drawback, however, is expense. Since the cameras are uncommon, there are no advantages of markets of scale. Further, the processing for the non-standard film is expensive.

Available software allows discrete images of a panorama to be converted into a continuous image. The process involves rotating a common chemical-film camera around its optical center or nodal point. During the rotation a series of discrete, overlapping photographs are taken. Rotation about the optical center ensures that perspective does not change from photograph to photograph. Thus, common portions of the panorama in successive photographs should perfectly match up. The photographs are developed and digitized, then scanned into a computer. There, the stitching software aligns successive photographs and removes any visible seams thus creating a continuous panoramic image.

SUMMARY OF THE INVENTION

The present invention is directed to systems and methods of capturing images of a panorama to allow the meshing of the images into a continuous image. In particular the invention is directed to mounts that rotate image capturing devices such that the images may be electronically stitched together.

In general, according to one aspect, the invention features an image capturing device mount. This mount includes a base that is adapted for connection to a supporting device and a frame on the base for carrying an image capturing device. Usually, such image capturing device is a chemical-film or digital camera. In some applications, a camera operating at video speeds will be useful for photographing a panorama at high speed. The mount has a rotational advance system in the base that enables the rotation of the frame through discrete angles through 360°.

In specific embodiments, the base includes an adaptor for connection to a standard camera tripod. Additionally, the rotational advance system is adapted to provide resistance to the rotation of the frame on the base at predetermined angular increments of the frame relative to the base. To accomplish this, the system preferably comprises a resiliently biased lever arm which engages dimples that are formed in replaceable disks of the base.

In other aspects of embodiments, the frame comprises a stationary arm that is attached to the base. A cantilevered arm extends from the stationary arm and is adjustably attached to the stationary arm along at least a portion of a length of the stationary arm. A mounting arm of the frame extends from the cantilevered arm and is adjustably attached to the cantilevered arm. This mounting arm is adapted to carry the image capturing device. This arrangement is advantageous because the mount can accommodate a wide range of cameras and types of lenses. In special cases where the range of adjustment is insufficient, longer replacement arms may be used.

In general, according to another aspect, the invention again features an image capturing device mount. This mount has a frame and a base that enables rotation of the frame. The frame has a foldable arm for carrying an image capturing device in both a portrait and landscape orientation.

In specific embodiments, the foldable arm extends perpendicularly from the cantilevered arm in an unfolded position and folds to be parallel with the cantilevered arm.

In general, according to still another aspect, the invention features a high-speed panorama capturing system. In many embodiments, this device will be a camcorder, preferably digital. A base rotates the image capturing device so that portions of a panorama are serially provided to the device. Preferably this rotation is continuous, rather than stepped through discrete angles. Alternatively, a mirror alone could be rotated, for example, to direct the portions of the panorama to a stationary image capturer. In either case, a controller coordinates the rotation with a timing of the images captured by the image capturing device to enable stitching of the images into a coherent panorama. As a result, a panorama can be photographed in less than one second with current technology since most camcorders, for example, can capture thirty to sixty images a second.

In specific embodiments, a stitcher directly receives the captured images from the image capturing device and assembles the images into a panoramic image. Preferably, the base rotates the image capturing device around its optical axis, requiring the mirror to reflect light to the image capturing device.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. Of the drawings:

FIG. 4B shows another embodiment of the ratcheting mechanism;

FIG. 5 is a schematic view of the forces exerted on the lever arm by the disk;

FIG. 7 is a perspective view showing the process of folding the support arm.

DETAILED DESCRIPTION OF THE PREFERRED EMBODIMENTS

Figure 1:
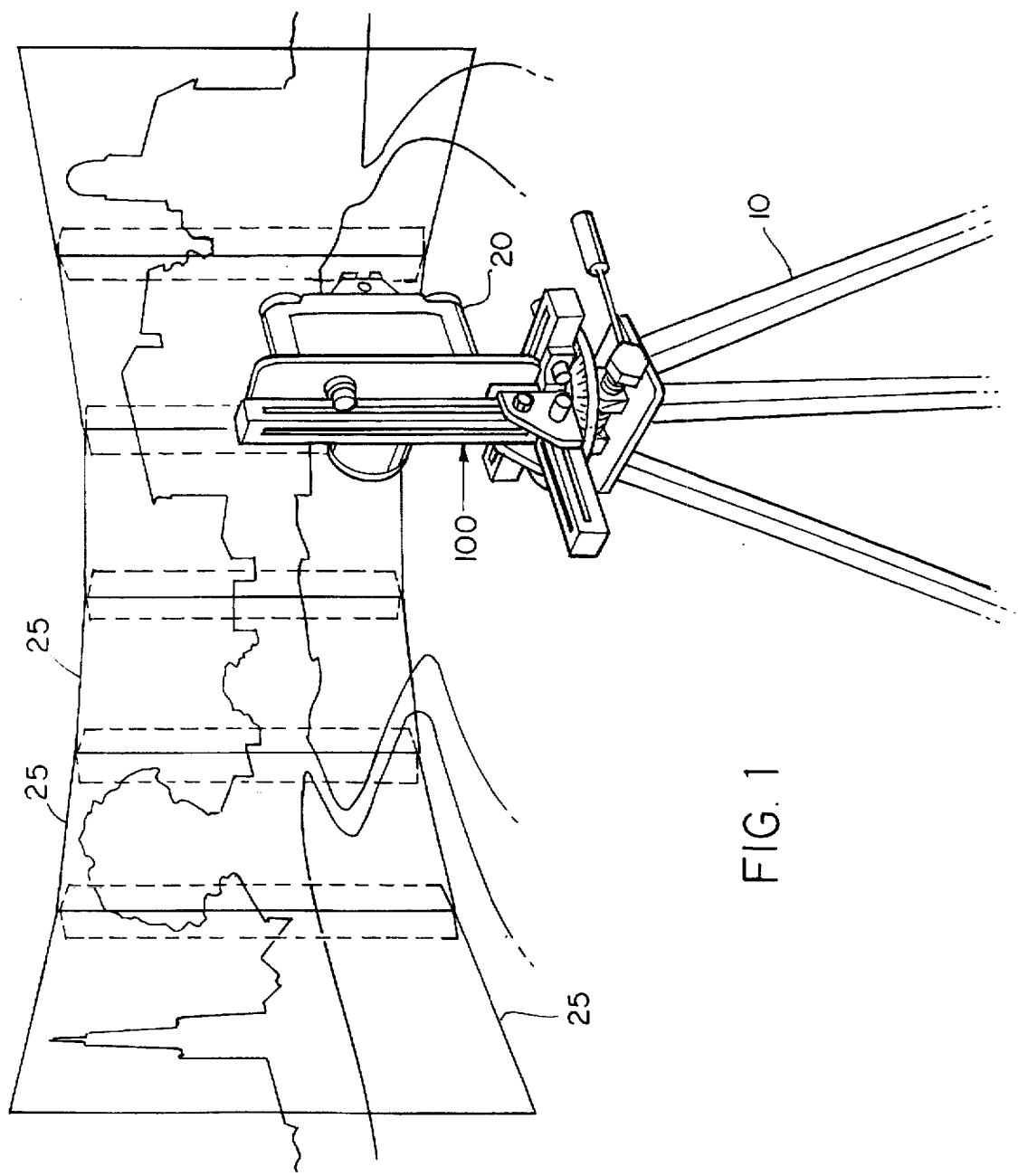
FIG. 1 is a schematic drawing illustrating the operation of the inventive panoramic camera mount in which successively captured images of a panorama are shown.

FIG. 1 illustrates the general operation of a panoramic camera mount 100, which has been constructed according to the principles of the present invention.

The inventive camera mount 100 is held on some type of supporting structure such as a standard camera tripod 10. An image capturing device, such as a camera 20, attaches to the mount 100.

The camera 20 may use any film format. Typically 35 mm is preferred due to its ubiquitous acceptance and high resolution. As the technology matures, however, it is expected that digital cameras will replace chemical-film cameras in most applications. Currently, resolutions of the digital cameras are lower than can be achieved with chemical film and optical scanning. The change from chemical to digital, however, is driven primarily by the fact that image data can be directly entered into a computer from the digital camera. The chemical development process and optical scanning of the print into the computer are avoided.

The mount 100 rotates the camera 20 between successive exposures 25 in order to capture a series of images that can be combined or stitched together in order to provide a full 360° or partial panorama. Preferably, these successive scenes are stitched together digitally—after the exposures have been digitized, if necessary—in a computer.

Many types of commercially available camera tripods allow the rotation of the camera. Typically, this is accomplished with a ball joint arrangement. The mount 100 of the present invention provides for a rotational mechanism in addition to that provided by the camera tripod to which it is usually attached. In operation, the tripod's ball joint is used to level the mount. Then, the mount is used to rotate the camera about a vertical axis. Moreover, as described in more detail below, the mount enables the camera's optical center to be located on this vertical axis.

Figure 2:
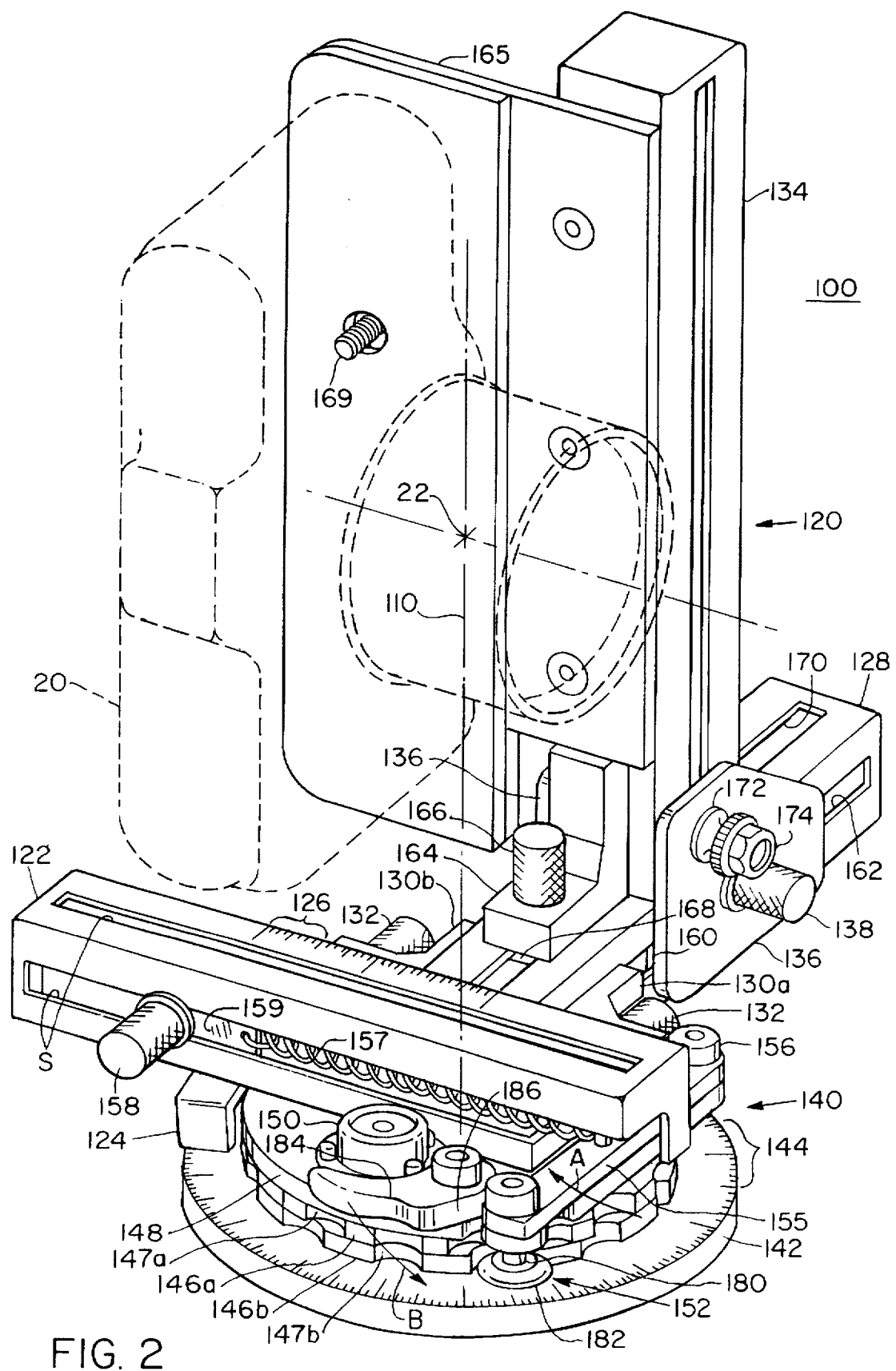
FIG. 2 is a detailed perspective view of the inventive panoramic camera mount with an exemplary camera shown in phantom.

FIG. 2 is a more detailed perspective view of the inventive mount 100 with the camera 20 shown in phantom.

Generally, the mount 100 comprises a camera frame 120 that is supported on a base 140. The base 140 enables rotation of the frame 120/camera 20 around a vertical axis 110. The frame 120 allows the camera 20 to be located relative to this axis 110 such that the axis 110 passes through a nodal point or optical center 22 of the camera's optics. This orientation avoids parallax problems, i.e., changes in the apparent position of objects between successive pictures, and facilitates the electronic stitching process. Features in adjacent captured images will properly align with each other.

The base 140 comprises a stationary base plate 142, which is adapted for connection to a standard camera tripod, not shown in this figure, see reference numeral 10 of FIG. 1. The base plate 142 preferably has degree markings 144 around its perimeter indicating 360° of arc.

At least one, but preferably two or more, DELRIN™ disks 146a, 146b are concentrically affixed to the base plate 142. The disks 146a, 146b may be made from other materials such as other hard, wear-resistant plastics or resins, or metals such as aluminum. Each DELRIN™ disk 146a, 146b has cut-outs or dimples 147a, 147b on the outer edge. The dimples 147a, 147b are evenly spaced around the outer perimeter of the disks. The top DELRIN™ disk 146a has dimples spaced at 20° increments; disk 146b has dimples spaced at 30° increments.

A top, generally circular, rotating plate 148 sits on topmost DELRIN™ disk 146a and is concentric with the disks and base plate 142. The top plate 148 connects to the base plate 142 to enable its rotation about the center axis 110, with the top-most DELRIN™ disk 146a additionally functioning as a friction plate.

A two dimensional level 150 is affixed to the top plate 148 along with a rotational advance system 152 and the camera frame 120. The rotational advance or indexing system 152 cooperates with the dimples 147a, 147b to provide step-wise rotation of the top plate 148 about the center axis 110 at, for example, 20° or 30° increments depending upon whether the system 152 is set to engage the upper or lower disk 146a, 146b.

The camera frame 120 comprises three mutually perpendicular arms: a base arm 122, a cantilevered arm 128 and a mounting arm 134. Each of these arms is preferably constructed from extruded aluminum. They can be standard structural members that have slots S formed in each lateral side. These slots allow connection to the arm by placing capture plates within these slots. With quick reference to FIG. 7 in which an exemplary end view of an arm, specifically the mounting arm 134, is shown, each slot S has two rails 192 for retaining the capture plate within the slot.

Returning to FIG. 2, the base arm 122 is fixed to the top plate 148 along one of its radii and perpendicular to the center axis 110. Connected to the base arm 122 is a pointer 124 for indicating a rotational position relative to the scale markings 144 of the base plate 142. The base arm 122 itself also has a scale 126 showing arbitrary distances away from the center of rotation 110 along the axis of the arm 122.

Figure 3:
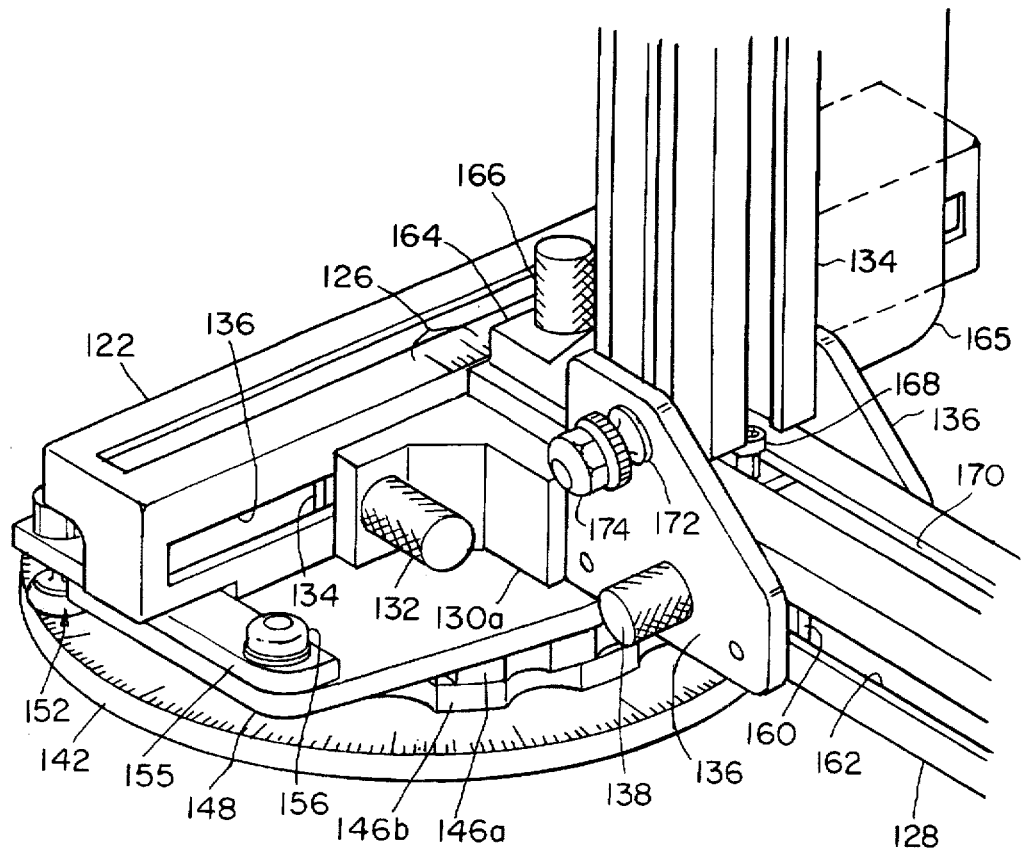
FIG. 3 a reverse angle view of the frame showing the connections between the base arm and the cantilever arm, and the cantilever arm and the support arm.

The cantilevered arm 128 extends perpendicularly away from the base arm 122 while also being adjustable along the length of the base arm. As best shown in conjunction with both FIGS. 2 and 3, the cantilever arm 128 includes two base-cantilever angle braces 130a, 130b. Two thumb screws 132 extend through the angle braces 130a, 130b and engage threads in a capture plate 134 held in a rail 136 of slot S in the base arm 122. In operation, the thumb screws 132 are loosened so that the cantilever arm 128 may slide forward or back. This allows the nodal point 22 to be located over the axis of rotation 110 in the direction of the axis of the base arm 122. Once this is accomplished, the thumb screws 132 are tightened to arrest any movement between the stationary and cantilever arms 122, 128.

The mounting arm 134 extends perpendicularly away from the cantilevered arm 128, vertically in typical operation. A mounting plate 165 connects the camera 20 to the mounting arm 134. A captured bolt 169 holds the camera 20 on the plate 165.

The mounting arm 134 is adjustable in its point of connection as the cantilever arm 128. Two side plates 136 provide a slidable attachment between the cantilever arm 122 and the mounting arm 134. The side plates 136 are held to the cantilever arm 128 by thumb screws 138, which extend through the plates and engage capture plates 160 retained by rail 162 in the cantilever arm 128. The mounting arm 134 includes an angle brace 164. Another thumb screw 166 extends through the angle brace 164 to engage a capture plate 168 held in rail 170 in the top surface of the cantilever arm 128.

The location of the camera nodal point 22 is moved relative to the axis of the cantilever arm 128 by adjusting the point of connection of the mounting arm 134 on the cantilever arm 128. This is accomplished by loosening thumb screws 166 and 138. The mounting arm 134 will then slide and the camera moved to properly locate the nodal point or optical center 22. As a result, by moving the points of connection of the cantilevered arm 128 and the mounting arm 134, the location of the camera's optical center can be moved in two dimensions along a plane that is parallel to the base 140, allowing the optical center 22 to be located on the axis of rotation. Further, since the cantilever arm 128 is perpendicular to the base arm 122 and the mounting arm is perpendicular to the cantilever arm, the adjustment in two dimensions is made for each direction independently of the other.

The use of the arms 122, 128, 134 provides advantages in the degree to which different cameras and lens can be accommodated. Each arm allows adjustment in the points of attachment of the other arms or camera along their lengths. Further, in extreme situations longer arms can easily be provided to further increase the range of possible adjustments.

The rotational advance or indexing system 152 is a ratcheting mechanism that allows the camera 20 to be rotated by predetermined discrete angles around the axis of rotation 110. It comprises a lever arm 155 that is attached to the top plate 148 via a pin 156, but free to pivot. A tension spring 157, having one end connected to the base arm 122 via a thumb screw 158 and capture plate 159, further connects to the lever arm 155 to resiliently bias it in the direction of arrow A. An axle 180 extends perpendicularly down from the proximal end of the lever arm 155. A lower end of this axle 180 carries a wheel 182.

The wheel 182 rides over a selected one of the outer surfaces of the DELRIN™ disks 146a or 146b and becomes seated in the dimples 147a or 147b along the outer surfaces of these disks. When seated in the dimples 147a or 147b, there is resistance to the rotation of the frame 120. Since these dimples are placed at 30° increments in the context of the bottom disk 146b, the rotation of the frame 120 and thus the camera 20 can be advanced by 30° increments by sensing the resistance as the wheel 182 falls into successive dimples along the outer surface of the bottom disk.

Figure 4A:
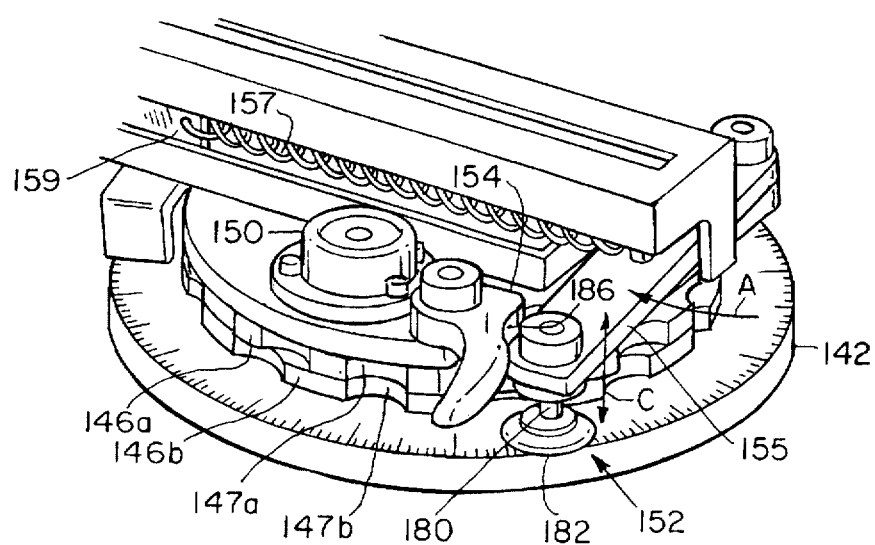
FIG. 4A shows the ratcheting mechanism in a disengaged state.

The upper disk 146a has dimples 147a but formed at 20° increments. The closer spaced dimples are generally used when the camera 20 is placed vertically in a portrait mode as opposed to horizontally in the landscape mode. Shifting from a disk with fewer dimples to one with more dimples is also desirable when switching to a lens with a longer focal length and thus a narrower field of view. Conversion is accomplished by moving a camming lever or trigger clutch 184 in the direction of arrow B. This movement causes an outer surface 186 of the camming lever 184 to engage the inner side of lever arm 155, thus pushing the lever arm away from the base and moving the wheel 182 out of contact with the bottom DELRIN™ disk 146b as shown in FIG. 4A. The outer surface 186 of the camming lever 154 is formed so that when it has been fully rotated, it locks into position holding the wheel 182 out of engagement. In this position, the camera 20 can be swiveled to any arbitrary angle of rotation. Also, however, since the wheel 182 is out of engagement with the disks, the axle 180 can slide vertically along its axis, see arrow C. As a result, when the camming lever 184 is retracted, the wheel 182 is now engaged with the top disk 146a which allows pictures to be taken at 20° increments through the 360° arc.

One advantage of this aspect of the present invention is the fact that the operation of the rotational advance or indexing system 152 is apparent to the user. Other known systems use ratcheting mechanisms that are hidden from view. This makes their operation less certain since it is harder to keep track of progress as a panorama is being photographed. In contrast with the present invention the user can more readily determine the number of photographs remaining by easily counting the number of dimples remaining or intuitively making an estimation by noting the progress of the wheel 182 around the disks. Moreover, marks may be made on the disks to indicate start and stop points, for example.

Those skilled in the art will recognize that additional disks could be added having dimples formed at increments other than 30° and 20°. Also, more than two disks could additionally be added to provide larger degrees of selection. The 30° and 20° angular increments, however, do have particular significance in the context of panoramic photography. Typically, when photographing panoramas, a short focal length lens, less than 50 mm, is used. The number of exposures necessary to photograph an entire 360° of panorama, while leaving some overlap between exposures to facilitate the stitching process depends on the camera's orientation. Approximately, 18 evenly spaced photographs are required when the camera is in the portrait orientation. Thus, this is the significance of the 20° spacing between dimples. In contrast, when the camera is in a landscape orientation, only approximately 12 photographs are required. This is because 35 mm film exposures are rectangular. Thus, the other disk has dimples spaced at 30°.

FIG. 5 is a schematic drawing illustrating the directions of force vectors that the disk 146a exerts on the wheel 182 in dependence upon the direction of rotation of the frame so that it is apparent to the operator in which direction the frame should be rotated. As shown, the lever arm 155 allows the wheel 182 to pivot in an arc E, a center of which is located at the pin 156. The pin 156 is intentionally located such that the lever arm is approximately tangential to the disk 146. Thus, when the frame 120 is rotated so that the wheel 182 moves in direction D along the outer surface of disk 146, the force vector exerted by the dimple 147 on the wheel 182 is generally in the direction of arrow F. Since this force vector F is tangential to circle E defining the wheel's pivoting arc, rotation of the frame occurs with relative ease. When the frame, however, is turned in the opposite direction so that the wheel 182 passes over the disk 146 in the direction of arrow H, the force vector acting on the wheel is in a substantially different direction. Arrow G illustrates the general direction of this force vector, which is almost radial to the arc E on which the wheel 182 pivots. Since the lever arm 155 is rigid, there is a greater resistance to rotation in this direction. This configuration provides an indication to the operator as to the proper direction for rotating the frame 120. It is easier to turn the frame 120 and thus wheel 182 in a clockwise direction D. This functionality provides a reminder to the user as to the preferred direction of rotation.

Thus, the operator will be less likely to begin a sequence of photographs and then forget the direction in which the photographs were being taken.

In other embodiments, the lever arm arrangement can be avoided by mounting the wheel 182 essentially where the pointer 124 is located as shown in FIG. 4B. This wheel 182' would be biased radially against the disks 146a, 146b by a resilient arm 198. At this time, this embodiment is not preferred since it can be rotated in either direction without any preference for one direction over the other.

Figure 6:
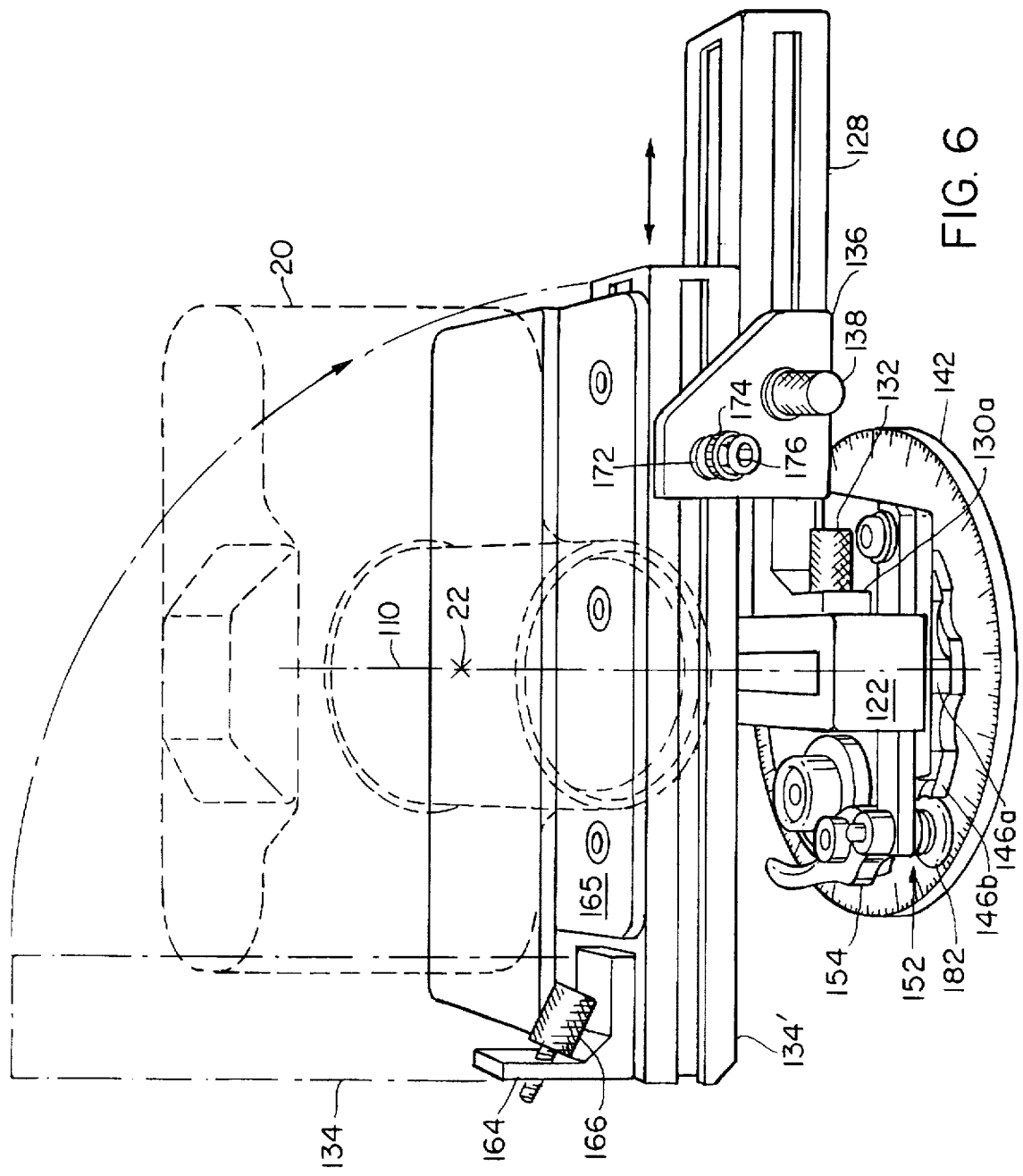
FIG. 6 is a perspective view of the inventive camera mount with the vertical support bar in a folded position for storage or shooting in a landscape mode.

FIG. 6 shows the panoramic camera mount 100 configured for holding the camera 20 in a landscape mode or orientation. For this mode, the mounting arm 134 has been folded to a horizontal position 134'. The wheel 182 is set to engage the lower DELRIN™ disk 146b since pictures spaced by 30° will be adequate to photograph the entire panorama owing to the fact that in the landscape mode, a 35 mm camera has a larger horizontal field of view.

Conversion to the landscape mode is best described by reference to FIG. 7. The mounting arm 134 is released to move to the folded position by first disengaging the thumb screw 166 from the capture plate 168. It is also usually helpful to loosen thumb screw 172, which allows the mounting arm to swing more freely around the axis 176. The thumbscrew 178 is retained on the axle 176 by a lock nut 174.

Returning to FIG. 6, to achieve the necessary image alignment, the optical center 22 of the camera 20 is again located over the axis of rotation 110. In this landscape mode, this can be accomplished by loosening thumbscrew 172 to enable the mounting plate 134 to slide to the left in FIG. 6. Additional adjustment can be achieved by also loosening thumbscrew 138 and sliding the plate 136 along the cantilevered arm 128. This mode also accommodates photography in stereo pairs since the camera can be easily shifted laterally between photographs.

Figure 8:
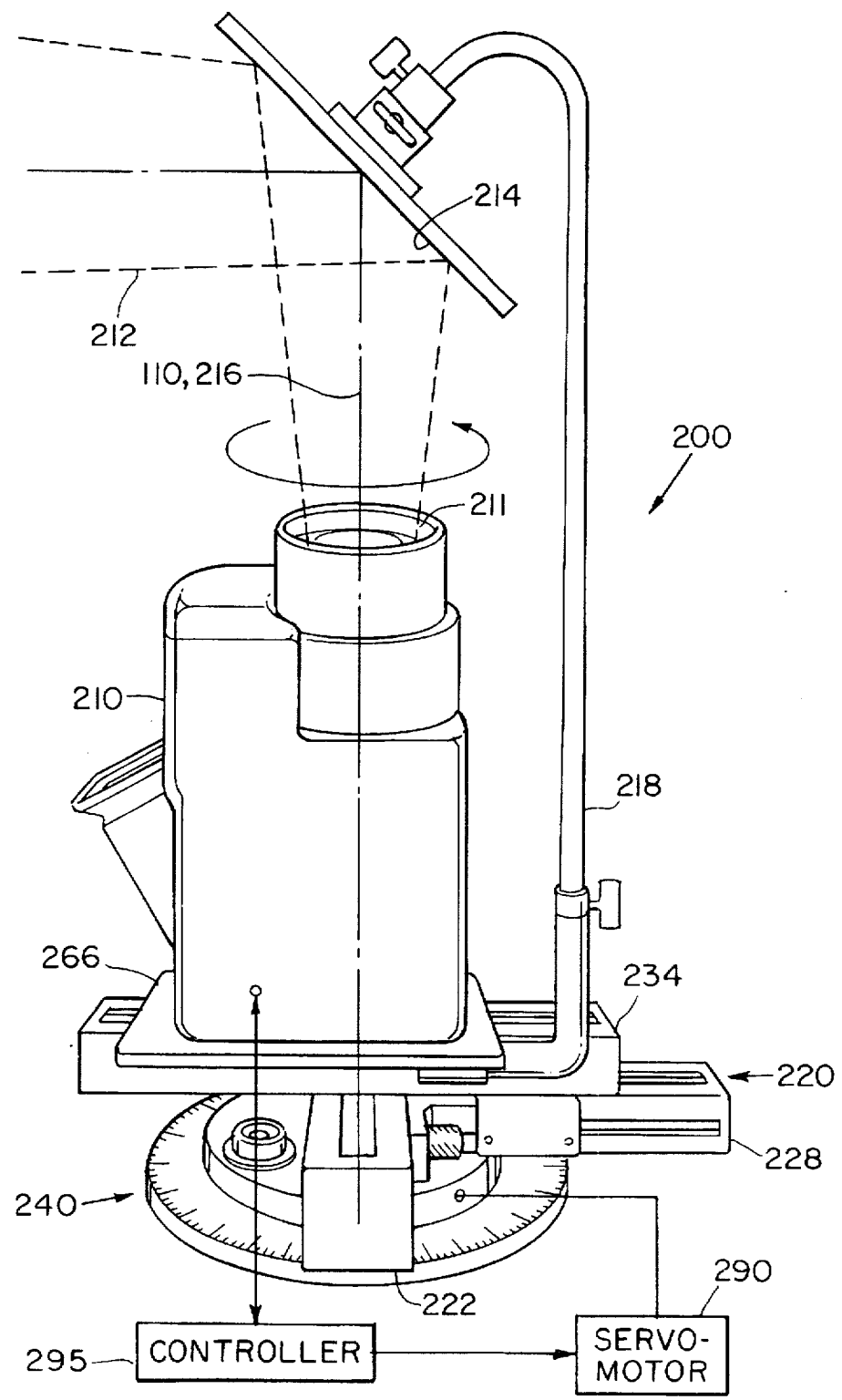
FIG. 8 shows a second embodiment of the panoramic camera mount adapted for photographing panoramas at high speed.

FIG. 8 shows a second embodiment of the image capturing device mount that has been adapted for high-speed panorama photography. Since this embodiment is designed to photograph a panorama in less than one second, the image capturing device 210 is preferably a digital camcorder which has a selectable shutter speed and preferably individual frame control.

When freezing action to avoid blurring a photograph in typical photography, the user must simply set the camera to the proper shutter speed, the faster the action, the faster the shutter speed that is required to freeze that action. When photographing a panorama with this second embodiment, the shutter speed of the camcorder must be set to be fast enough to freeze any action in the surrounding panorama and negate the effects of the camcorder's rotation. This will ensure that each captured image is not blurred. To ensure that there is coherence between adjacent images, however, the speed of rotation of the camcorder must also be considered. For example, if the panorama to be photographed is a town square with people walking through the square, the speed of rotation of the camcorder must not be so slow as to allow people to move between successive frames in the time it takes to take those successive images. A conventional digital camcorder can capture 30 frames a second. As a result, this leaves a 30th of second between adjacent frames which will be quick enough to substantially freeze action between successive captured images in many situations.

The rotation of the camcorder is envisioned to be approximately 60 rpms in many applications. This speed can detrimentally impact any mechanical operation within the image capturing device 210. As a result, the image capturing 210 is in a vertical orientation. This minimizes any rotational inertia and the centripetal forces on the image capturing device 210 since most of the physical components of the camcorder are located along or near the axis of rotation 110.

Light 212 from the surrounding panorama is reflected by mirror 214 vertically down to the entrance aperture 211 of the image capturing device 210. In this embodiment, it is also important that the optical center of the camera be located over the center of rotation. This is accomplished by positioning the camera such that the optical axis 216 is coextensive with the axis of rotation 110.

A frame 220 of the mount 200 comprises a mounting arm 234 which slidably engages a cantilevered arm 228. The image capturing device 210 is held on a mounting plate 266 that is attached to the mounting arm 234. A mirror arm 218 extends from the mounting arm 234 to support the mirror 214 above the optics of the image capturing device 210. The cantilevered arm 228 is in turn slidably connected to a base arm 122. A base 240 supports the frame 220. In this embodiment, however, the frame 220 is rotated on the base 240 by a servo motor 290. The rotation may be in a stepped fashion but continuous rotation is preferable as long as the image capturing device will support the necessary shutter speeds to freeze action.

The image capturing device 210 and the servo motor 290 are cooperatively controlled by a controller 295. It is important that the servo motor turn the frame 220 relative to the speed at which the image capturing device 210 takes pictures to ensure that the pictures are evenly spaced and there is enough overlap between pictures to allow electronic stitching. Preferably, the electronic stitching also takes place in the controller 295. This is accomplished by the image capturing device 210 directly dumping the captured images to the controller 295 as they are being successively captured.

It is also recognized that it is not necessary to rotate the image capturing device to photograph the panorama. That is, only the mirror 214 could be rotated so that the portions of the panorama are serially and continuously provided to camcorder, for example, as is achieved in the device of FIG. 8. This embodiment is less preferred with current technology since most camcorders capture rectangular images. Thus, in this embodiment, the panorama would be made up of a series of rectangular images at various angles with respect to each other. This would create problems in the stitching process. A camcorder that captures circular images would solve this problem to some degree, but presents its own problems since it would be difficult to photograph a panorama using only circular photographs.

While this invention has been particularly shown and described with references to preferred embodiments thereof, it will be understood by those skilled in the art that various changes in form and detail may be made therein without departing from the spirit and scope of the invention as defined by the appended claims.

I claim:

1. An image capturing device mount, comprising:
   a frame for supporting an image capturing device;
   a base adapted for connection to a support device, carrying the frame, and enabling the frame to be rotated through 360°; and
   a rotational advance system that indexes the rotation of the frame to discrete angles, and that provides greater resistance to rotation in one direction than the other when rotated between the discrete angles.

2. A mount as described in claim 1, wherein the discrete angles are selectable as 20° or 30°.

3. A mount as described in claim 2, wherein the support device is a camera tripod.

4. A mount as described in claim 1, wherein the rotational advance system provides resistance to the rotation of the frame on the base at predetermined angles of the frame relative to the base.

5. An image capturing device mount, comprising:

a frame for supporting an image capturing device;

a base adapted for connection to a support device, carrying the frame, and enabling the frame to be rotated through 360°; and a rotational advance system for indexing the rotation of the frame to discrete angles;

wherein the rotational advance system comprises a resiliently biased lever arm for offering resistance to the rotation of the frame on the base at predetermined angles of rotation of the frame relative to the base.

6. A mount as described in claim 5, wherein the base has a plurality of dimples for offering resistance to the lever arm.

7. A mount as described in claim 5, wherein the base comprises at least one replaceable disk in which the dimples are formed.

8. A mount as described in claim 5, wherein the base further comprises a wheel rotatably mounted to the lever arm for engaging the dimples.

9. An image capturing device mount, comprising:

a frame for supporting an image capturing device;

a base adapted for connection to a support device, carrying the frame, and enabling the frame to be rotated through 360°; and a rotational advance system for indexing the rotation of the frame to discrete angles;

wherein the frame comprises:

a stationary arm attached to the base;

a cantilevered arm extending from the stationary arm and being adjustably attached to the stationary arm along at least a portion of a length of the stationary arm; and a mounting arm extending from the cantilevered arm, the mounting arm being adjustably attached to the cantilevered arm and adapted to carry the image capturing device.

10. A mount as described in claim 9, wherein the mounting arm is foldable to a horizontal position.

11. An image capturing device mount, comprising:

a base; and a frame, rotatably mounted to the base, including:

a cantilevered arm that extends horizontally from and is slidably attached to the base, and a foldable arm, slidably attached to a slot in the cantilevered arm, for carrying an image capturing device in both a portrait orientation and landscape orientation, in which the image capturing device is rotated around its optical axis relative to the portrait orientation.

12. A mount as described in claim 11, wherein the base includes an adaptor for connection to a support device.

13. A mount as described in claim 11, wherein the base comprises a rotational advance system for indexing the rotation of the frame to discrete angles.

14. A mount as described in claim 13, wherein the rotational advance system provides resistance to the rotation of the frame at predetermined angles of the frame relative to the base.

15. A mount as described in claim 11, wherein the frame further comprises a stationary arm attached to the base, the cantilevered arm being adjustably attached to the stationary arm along at least a portion of a length of the stationary arm.

16. A mount as described in claim 15, wherein the foldable arm extends parallel to the cantilevered arm in a folded position.

17. An image capturing device mount, comprising:

a frame including a foldable arm for carrying an image capturing device in both a portrait and landscape orientation; and a base for enabling rotation of the frame; and a rotational advance system that indexes the rotation of the frame, and that comprises a resiliently biased lever arm for offering resistance to the rotation of the frame on the base at predetermined angles of rotation of the frame relative to the base.

18. An image capturing device mount, comprising:

a base; and a frame, rotatably mounted to the base, for supporting an image capturing device, the frame including:

a stationary arm attached to the base; and a cantilevered arm that extends horizontally and perpendicularly from the stationary arm and is slidably attached to a slot in the stationary arm.

19. A mount as described in claim 18, further comprising a third arm that extends perpendicularly and vertically from the cantilevered arm, that is slidably attached to the cantilevered arm, and that carries the image capturing device.

* * * * *